(12) United States Patent
Edwards et al.

(10) Patent No.: US 10,829,280 B2
(45) Date of Patent: Nov. 10, 2020

(54) COMPOSTABLE SINGLE-USE BEVERAGE CONTAINER AND ASSOCIATED MECHANISM FOR SEALING THE CONTAINER

(71) Applicant: Drop Water Corporation, Menlo Park, CA (US)

(72) Inventors: Scott Paul Edwards, Menlo Park, CA (US); William Gregory Tammen, Durham, NC (US)

(73) Assignee: Drop Water Corporation, Menlo Park, CA (US)

( * ) Notice: Subject to any disclaimer, the term of this patent is extended or adjusted under 35 U.S.C. 154(b) by 333 days.

(21) Appl. No.: 15/360,033

(22) Filed: Nov. 23, 2016

(65) Prior Publication Data

US 2017/0158393 A1 Jun. 8, 2017

Related U.S. Application Data

(60) Provisional application No. 62/386,472, filed on Dec. 3, 2015.

(51) Int. Cl.
*B65D 53/02* (2006.01)
*B65D 8/00* (2006.01)
*B65B 7/28* (2006.01)
*B65B 61/20* (2006.01)
*B65D 3/10* (2006.01)
*B65D 3/28* (2006.01)
*B65D 21/02* (2006.01)
*B65D 25/16* (2006.01)
*B65D 41/02* (2006.01)
*B65D 65/46* (2006.01)
*B65B 3/04* (2006.01)
*B65B 43/42* (2006.01)

(52) U.S. Cl.
CPC ............... *B65D 53/02* (2013.01); *B65B 7/28* (2013.01); *B65B 7/2835* (2013.01); *B65B 61/202* (2013.01); *B65D 3/10* (2013.01); *B65D 3/28* (2013.01); *B65D 15/04* (2013.01); *B65D 21/0233* (2013.01); *B65D 41/02* (2013.01); *B65D 65/466* (2013.01); *B65B 3/04* (2013.01); *B65B 43/42* (2013.01); *Y02W 90/10* (2015.05)

(58) Field of Classification Search
CPC ........ B65D 77/06; B65D 77/065; B65D 5/56; B65D 53/02; B65D 25/14; B65D 25/16
USPC ........ 220/495.03, 495.06, 495.1; 229/117.27
See application file for complete search history.

(56) References Cited

U.S. PATENT DOCUMENTS 2,454,919 A 11/1948 Hagan
3,082,927 A 3/1963 Winstead
(Continued)

FOREIGN PATENT DOCUMENTS

JP H07-112706 5/1995
JP H09-226703 9/1997

*Primary Examiner* — Janie M Loeppke
(74) *Attorney, Agent, or Firm* — DLA Piper LLP (US)

(57) ABSTRACT

The present invention relates to a novel beverage container and a mechanism for securing a cap to the container within an automated kiosk. The container comprises a compostable shell, beverage bag, and other components. The beverage bag is sealed to a closure shoulder using a mechanical sealing ring, optionally without the use of using heat, glue or ultrasonic energy. The cap is secured to the closure shoulder by the mechanism within the kiosk.

17 Claims, 9 Drawing Sheets

(56) References Cited

U.S. PATENT DOCUMENTS

| | | | |
|---|---|---|---|
| 4,165,023 A | 8/1979 | Schmit | |
| 4,524,883 A * | 6/1985 | Herring | B65D 77/065 |
| | | | 206/509 |
| 4,850,509 A * | 7/1989 | Hollenberg | B65D 5/3607 |
| | | | 206/205 |
| 5,265,753 A | 11/1993 | Moorman | |
| 5,375,741 A | 12/1994 | Harris | |
| 2001/0004994 A1 | 6/2001 | Andrews, Sr. et al. | |
| 2009/0020687 A1 | 1/2009 | Lehmann | |
| 2009/0202687 A1 | 8/2009 | Griego et al. | |
| 2010/0084361 A1 | 4/2010 | Dayton et al. | |
| 2010/0089672 A1 | 4/2010 | Lee et al. | |
| 2011/0248035 A1* | 10/2011 | Peirsman | B67D 1/0462 |
| | | | 220/495.06 |
| 2013/0193020 A1* | 8/2013 | Corbett | A47J 31/4403 |
| | | | 206/459.5 |
| 2013/0284797 A1 | 10/2013 | Ouillette | |
| 2014/0353364 A1* | 12/2014 | Coogan | B65D 77/065 |
| | | | 229/117.3 |

* cited by examiner

FIGURE 1A      FIGURE 1B
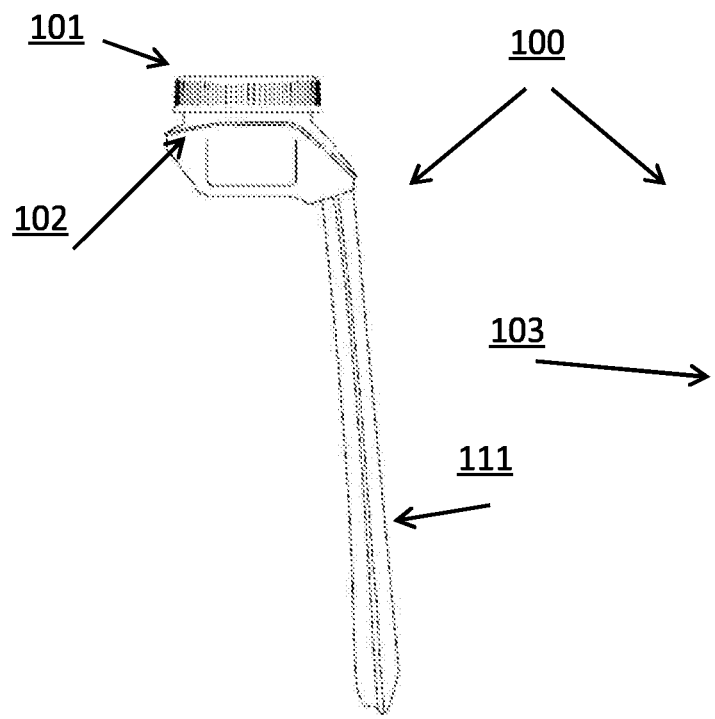
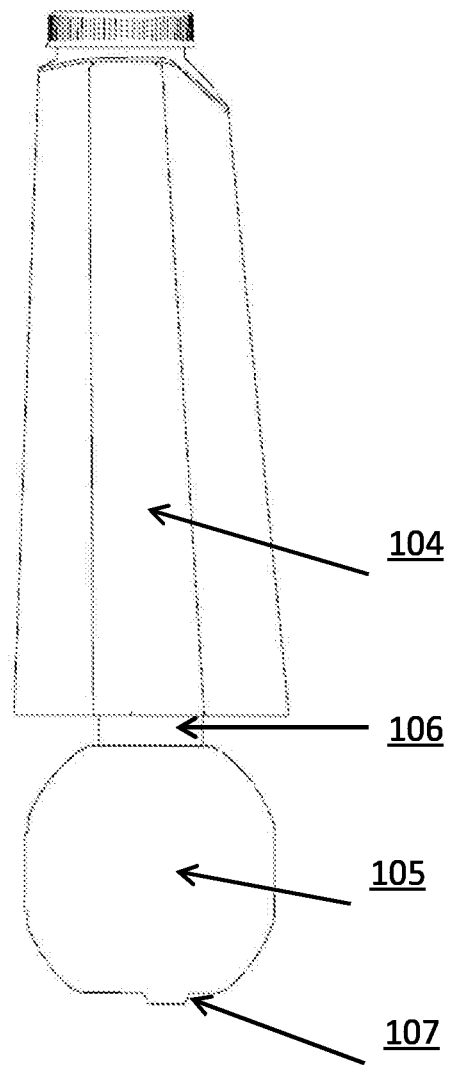

FIGURE 2A FIGURE 2B
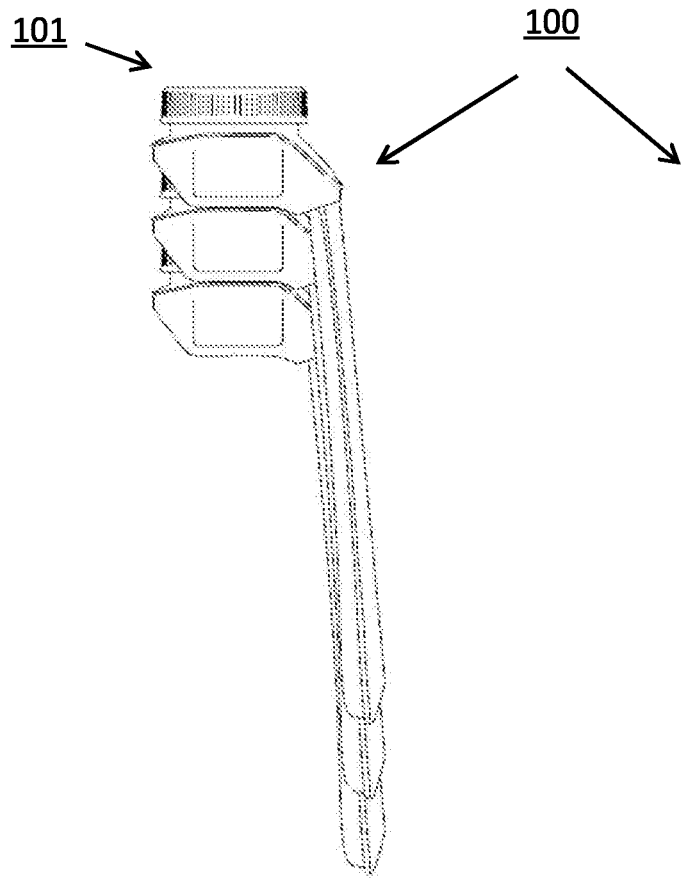
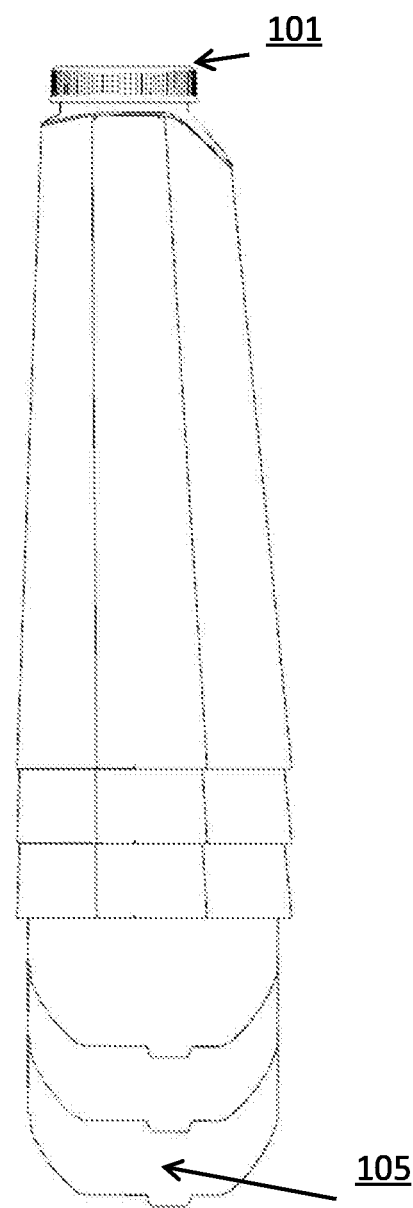

FIGURE 3A  FIGURE 3B  FIGURE 3C
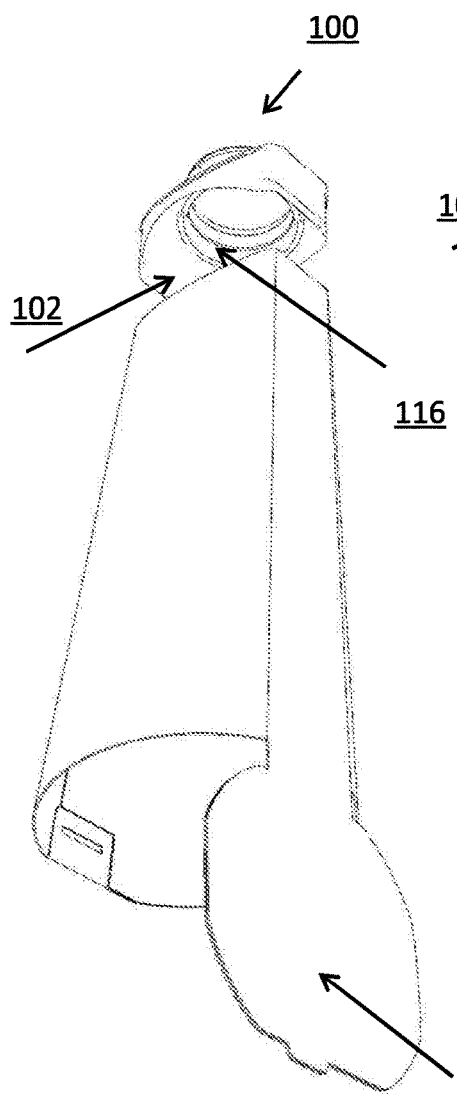
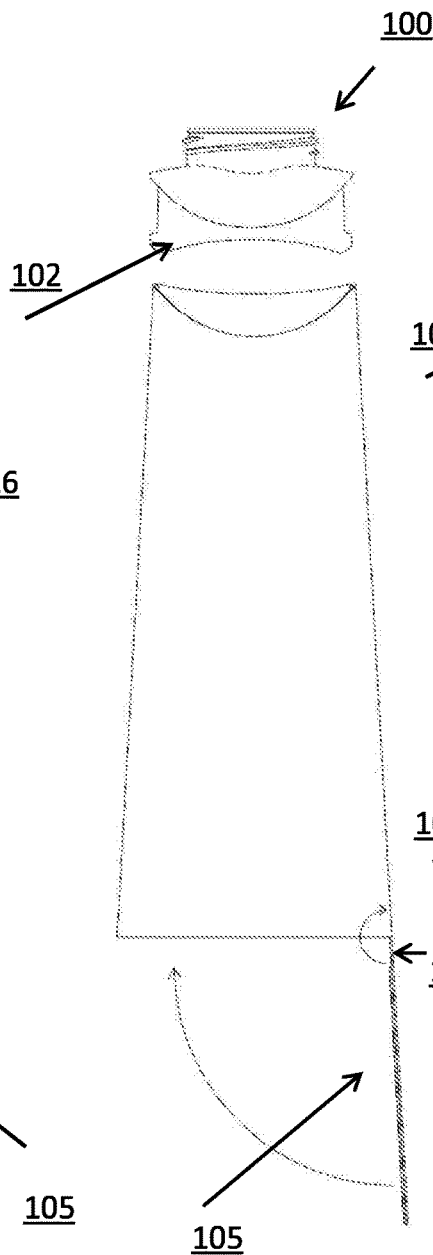
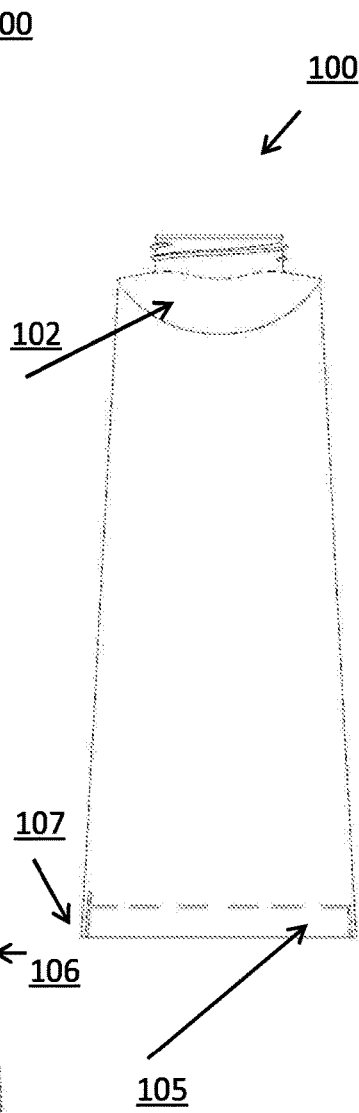

FIGURE 4A     FIGURE 4B
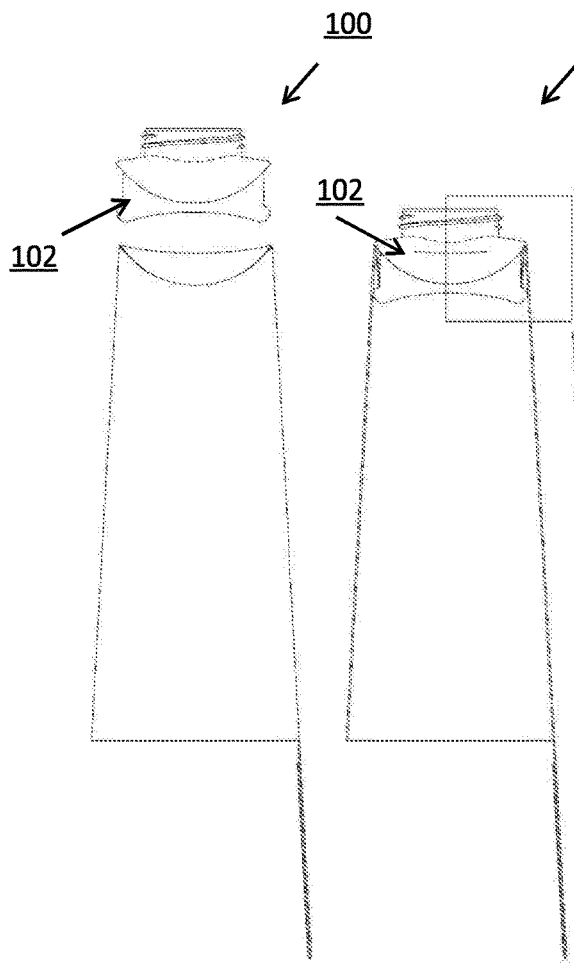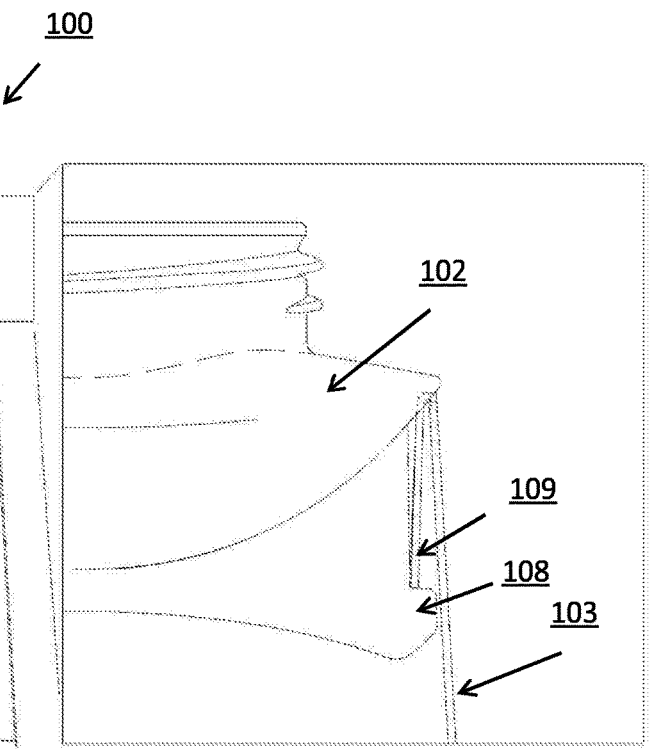

FIGURE 5A
FIGURE 5B
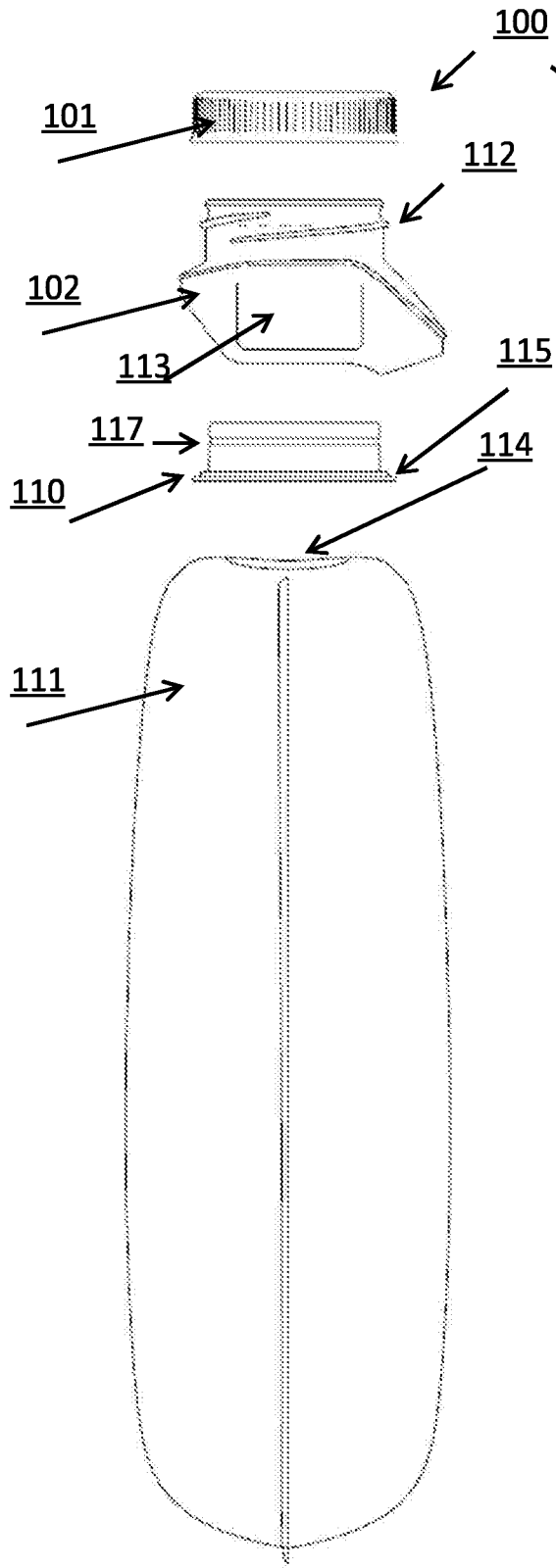
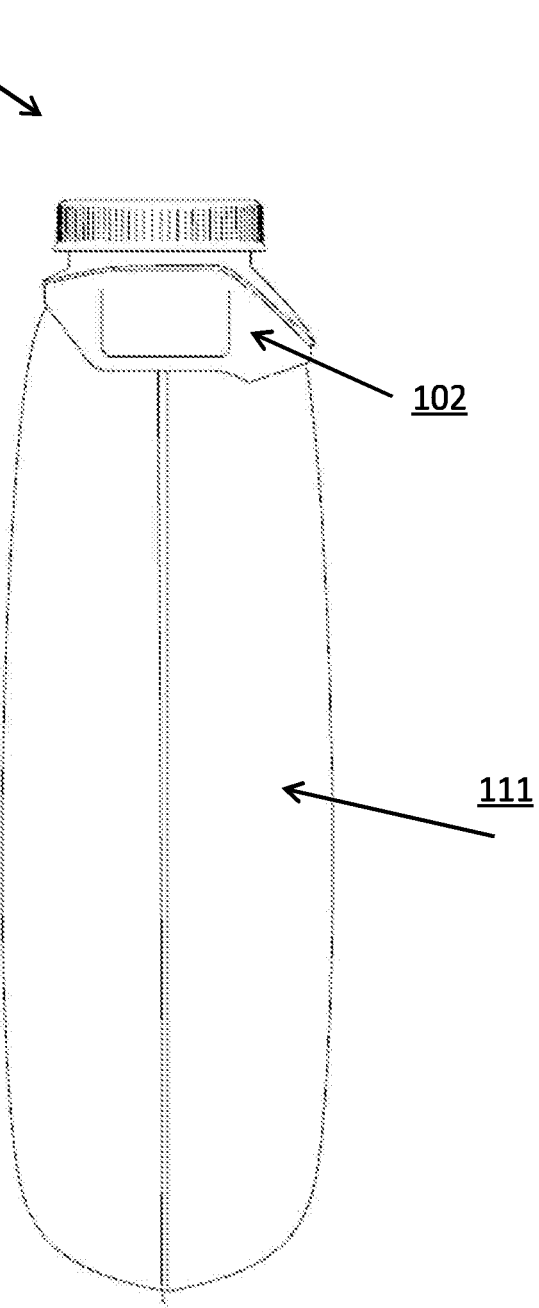

COMPOSTABLE SINGLE-USE BEVERAGE CONTAINER AND ASSOCIATED MECHANISM FOR SEALING THE CONTAINER

PRIORITY CLAIM

This application claims priority under 35 USC Sections 119(e) and 120 to U.S. Provisional Patent Application Ser. No. 62/386,472, filed on Dec. 3, 2015 and titled "Capper System for Eco-Friendly Beverage Dispensing Kiosk," which is incorporated by reference herein.

TECHNICAL FIELD

The present invention relates to a novel beverage container and a mechanism for securing a cap to the container within an automated kiosk. The container comprises a compostable shell, beverage bag, and other components. The beverage bag is sealed to a closure shoulder using a mechanical sealing ring, optionally without the use of using heat, glue or ultrasonic energy. The cap is secured to the closure shoulder by the mechanism within the kiosk.

BACKGROUND OF THE INVENTION

The traditional consumer beverage industry is inefficient and wasteful because of the massive amount of weight that must be transported and the amount of plastic used to contain that liquid. Furthermore, the packaging materials used must be very robust in order to survive a long distribution chain and shelf life, making natural degradation nearly impossible which causes environmental harm when waste from this industry is mismanaged.

The prior art method used by the traditional consumer beverage industry for creating and distributing consumer beverages (such as bottled water, sports drinks, carbonated drinks, and flavored water) is to injection blow mold a rigid container with a screw cap closure out of PET (polyethylene terephthalate), fill the container, seal it, palletize it, and ship it around the world. This method demands a robust packaging material which ensures the beverage will get to the consumer unharmed and ready to drink; however, this also means the package will be excessively hard to be broken down by nature which has caused massive amounts of plastic waste to accumulate in waterways, as observed by the NOAA. In addition, it is well-known that disposable plastic bottles and other containers being consumed on a global scale have caused massive ecological damage due to the consumption of fossil fuels to transport beverages from the bottling plant to the consumer.

Applicant previously filed U.S. patent application Ser. No. 14/242,295, titled "System and Method for Eco-Friendly Beverage Dispensing Kiosk" (the "Kiosk Application") on Apr. 1, 2014, which is incorporated herein by reference. The Kiosk Application describes a novel automated kiosk for dispensing filtered water from a local water supply into beverage containers. The beverage containers are pre-loaded into the kiosk and stacked in a space-efficient manner. The automated kiosk described in the Kiosk Application has been successful in providing an environmentally-friendly improvement over traditional consumer beverage dispensing machines. However, based on Applicant's experience, certain improvements are still needed, particular in the design of the beverage container itself and the mechanism by which the bottle is assembled, filled, and capped within the kiosk.

SUMMARY OF THE INVENTION

Applicant has invented an improved beverage container design for use with the invention of the Kiosk Application. Applicant has further invented an improved system and method for assembling the beverage container, filling the container, and securing a cap to the container within the kiosk.

The present invention relates to a novel beverage container and a mechanism for securing a cap to the container within an automated kiosk. The container comprises a compostable shell, beverage bag, and other components. The beverage bag is sealed to a closure shoulder using a mechanical sealing ring, optionally without the use of using heat, glue or ultrasonic energy. The cap is secured to the closure shoulder by the mechanism within the kiosk. The container is an easily biodegradable (e.g., "compostable" or "home compostable" under ASTM standards) container for use in the sale of bottled water and other beverages. It is designed for use in beverage kiosks, including but not limited to the disclosed kiosk in the Kiosk Application, that fill the container onsite at the time of purchase. It is designed in such a way that it can pass the tests needed for certification by various standards bodies to be designated and sold as "compostable" or "home compostable" or with a similar designation.

In one aspect of the invention, a mechanical sealing insert is used to attach a beverage bag to a closure shoulder of the beverage container.

In another aspect of the invention, the shell of the container is comprised of a sheet material, including but not limited to paper, paperboard, and/or laminated cellulose fiber that is cut, and or die cut and folded into a rigid three dimensional body with one-way paperboard locking flaps for the purpose of retaining the liquid holding closure assembly, optionally without the aid of glue, heat, ultrasonic means, or any other adhesion techniques.

In another aspect of the invention, the container is designed to nest with other containers of the same kind while the internal surfaces of the liquid holding assembly are sealed to ensure sterility during transportation and storage.

In another aspect of the invention, a system and method for fitting a sealing cap to a beverage container in the kiosk as part of the filling and delivery process is utilized. The invention removes a beverage container body from a stack stored in the kiosk, unscrews a previously-fitted cap from the beverage container, positions the beverage container for filling, screws the cap back onto the beverage container, and performs all necessary movement of the beverage container through the process.

The present invention, as with the invention of the Kiosk Application, enables users to avoid the harmful prior art means of packaging and distributing of beverages by enabling the use of the environmentally friendly materials and by not filling the beverage container until the customer purchases it, which eliminates the unnecessary transportation of water, reducing transportation cost and $CO_2$ emissions by significantly more than an order of magnitude.

BRIEF DESCRIPTION OF THE DRAWINGS

FIGS. 1A and 1B depict a side-view of certain components of the inventive beverage container.

FIGS. 2A and 2B depict a side-view of a nested stack of multiple units of the inventive beverage container.

FIGS. 3A, 3B, and 3C depict another side-view of certain components of the inventive beverage container.

FIGS. 4A and 4B depict a side-view of a locking mechanism in the inventive beverage container.

FIGS. 5A and 5B depict a side-view of a securing mechanism in the inventive beverage container that secures a beverage bag between a mechanical sealing ring and the closure shoulder.

DETAILED DESCRIPTION OF THE PREFERRED EMBODIMENTS

Figure 6A:
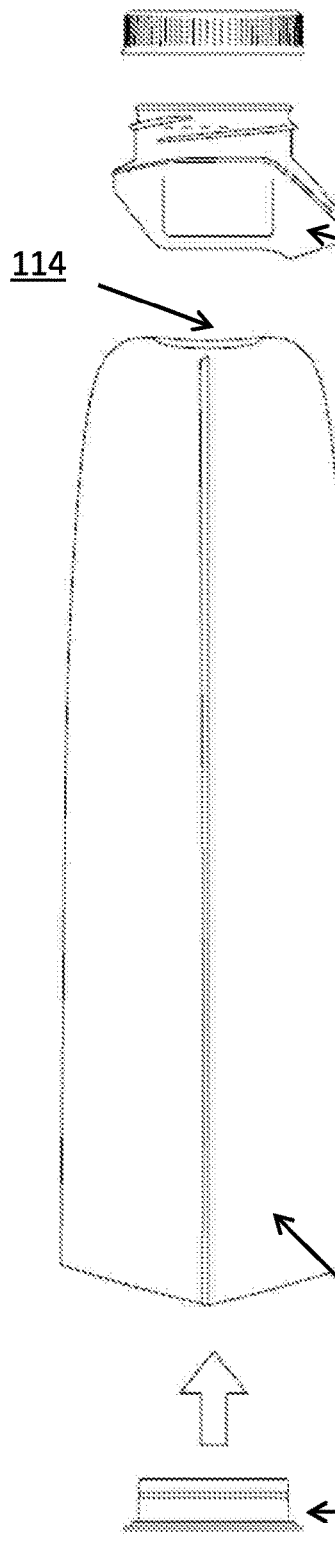
FIGS. 6A, 6B, and 6C depict a side-view of the inventive beverage container in various states of assembly.

An embodiment of the invention is depicted in FIGS. 1-8. FIGS. 1A and 1B depict side-views of beverage container 100. With reference to FIG. 1A, beverage container 100 comprises cap 101, closure shoulder 102, and beverage bag 111. With reference to FIG. 1B, shell 103 is now depicted. Shell 103 comprises body 104, hinge 106, and bottom flap 105. Bottom flap 105 comprises notch 107.

FIGS. 2A and 2B depict side-views of a stack of beverage containers 100. As can be seen, beverage container 100 is designed to allow a nested configuration wherein multiple units of beverage container 100 are stacked. Each beverage container 100 contains cap 101 already secured to its closure shoulder 102. The cap 101 of a first unit can fit within the closure shoulder 102 of a second unit stacked on top of the first unit. The bottom flap 105 of each unit is open and nested together as shown in FIG. 2B.

FIGS. 3A, 3B, and 3C depict side-views of beverage container 100. In FIG. 3A, a bottom view of closure shoulder 102 is included. Closure shoulder 102 comprises locking ring 116. In FIG. 3B, it can be seen that bottom flap 105 can move via hinge 106 from a detached position to an attached position, wherein bottom flap 105 closes the bottom of beverage container 100 such that it is substantially perpendicular to the side wall of shell 103. In FIG. 3C, it can be understood that notch 107 engages with the side wall of shell 103 (optionally, by inserting into a slit in the slide wall of shell 103) to hold bottom flap 105 in place.

FIGS. 4A and 4B depict additional side-views of beverage container 100. FIG. 4B contains an enlarged view of part of closure shoulder 102 after it is inserted into shell 103. Closure shoulder 102 comprises protrusion 108 formed by a cavity in closure shoulder 102. Shell 103 comprises locking tab 109, which here is part of shell 103 folded downward. Locking tab 109 engages with protrusion 108, which prevents closure shoulder 102 from being pulled out of shell 103 during normal usage by a consumer.

FIGS. 5A and 5B depict additional side-views of beverage container 100. Cap 101 can screw onto a drinking spout 112 of closure shoulder 102. Drinking spout 112 comprises screw threads on its outer vertical surface. Closure shoulder 102 comprises cavity 113, which includes locking ring 116 for receiving locking ring 117 on mechanical sealing ring 110. Beverage container 110 further comprises beverage bag 111, which is capable of holding water or other liquid. The outer diameter of the top surface of the bottom lip 115 of mechanical sealing ring 110 is larger than the opening 114 of beverage bag 111. Optionally, the diameter of locking ring 117 of mechanical sealing ring 110 also is larger than opening 114 of beverage bag 111, such that the opening 114 is stretched to receive mechanical sealing ring 110.

During manufacturing of beverage bag 111, mechanical sealing ring 110 is placed into beverage bag 111 from the bottom of beverage bag 111 (which initially is open on the bottom). Mechanical sealing ring 110 is then moved upward until opening 114 rests on top surface of the bottom lip 115 of mechanical sealing ring 110. Mechanical sealing ring 110 is then pushed into closure shoulder 102 such that locking ring 117 is pushed over locking ring 116, which locks mechanical sealing ring 110 into place within closure shoulder 102, which secures beverage bag 111 to closure shoulder 102. The bottom of beverage bag 111 is then sealed using heat, ultrasound (e.g., Ultrasonic welding), or other known means.

Figure 6B:
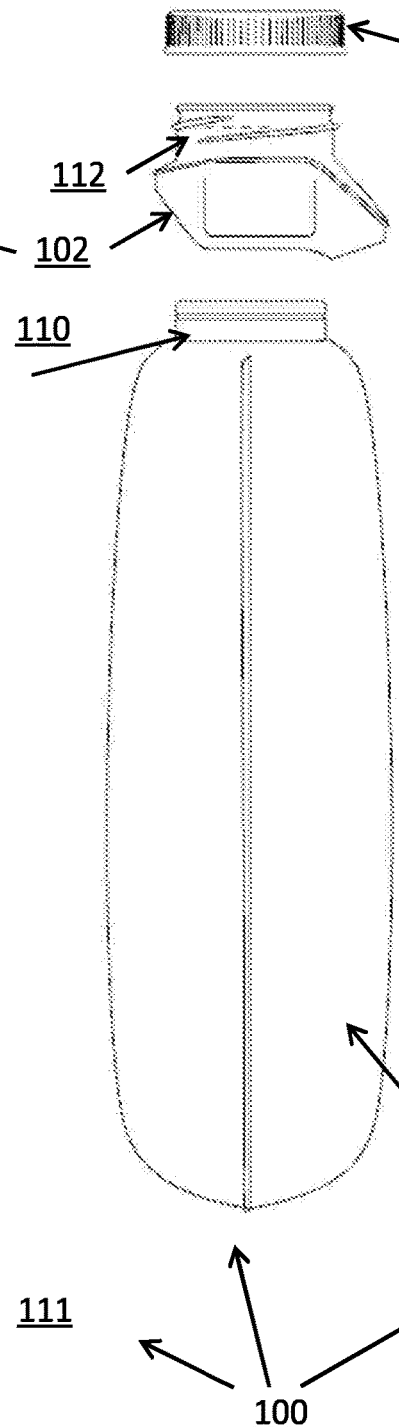
Figure 6C:
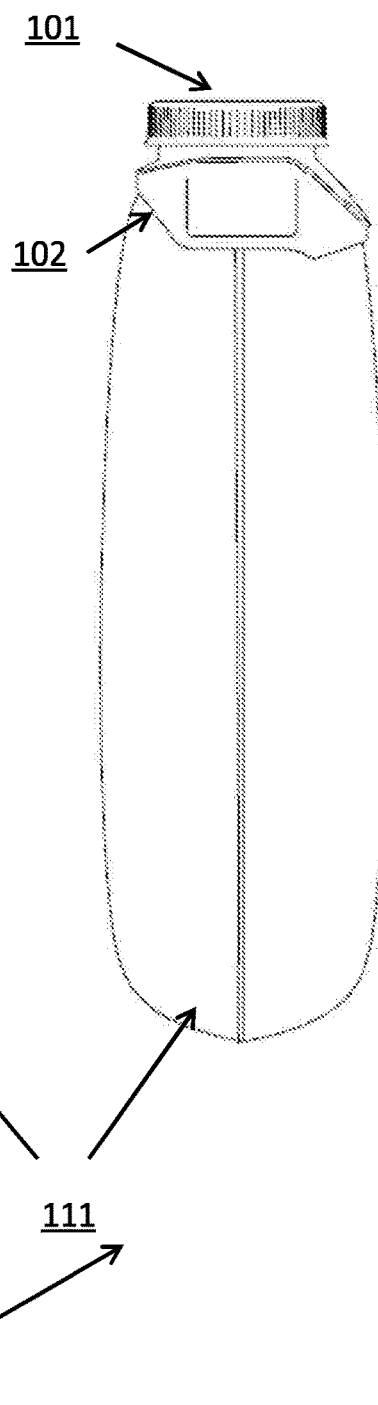

FIGS. 6A, 6B, and 6C depict additional side-views of beverage container 100. In FIG. 6A, beverage bag 111 has an open bottom. Mechanical sealing ring 110 is placed through the bottom of beverage bag 111 (as discussed above) and is secured to closure shoulder 102. In FIG. 6B, mechanical sealing ring 110 extends through opening 114 of beverage bag 111 (which has now been sealed on the bottom) and is secured to closure shoulder 102. In FIG. 6C, cap 101 is screwed onto threads of drinking spout 112.

Figure 7:
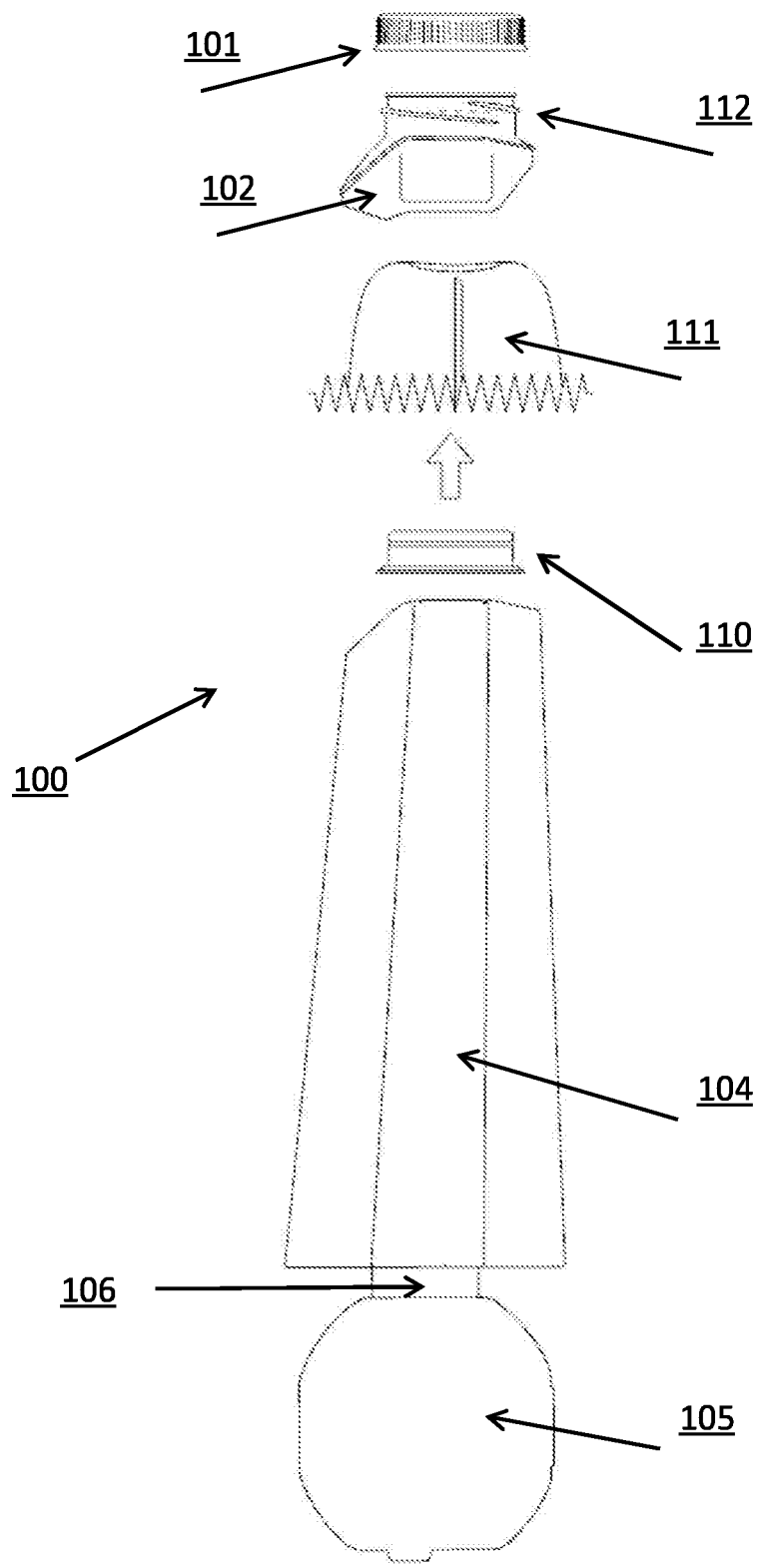
FIG. 7 depicts an exploded side view of various components of the inventive beverage container.

FIG. 7 depicts another side-view of beverage container 100. Again, mechanical sealing ring 110 is secured to closure shoulder 102, which secures beverage bag 111 between mechanical sealing ring 110 and closure shoulder 102 in a watertight fashion.

Figures 8A, 8B:
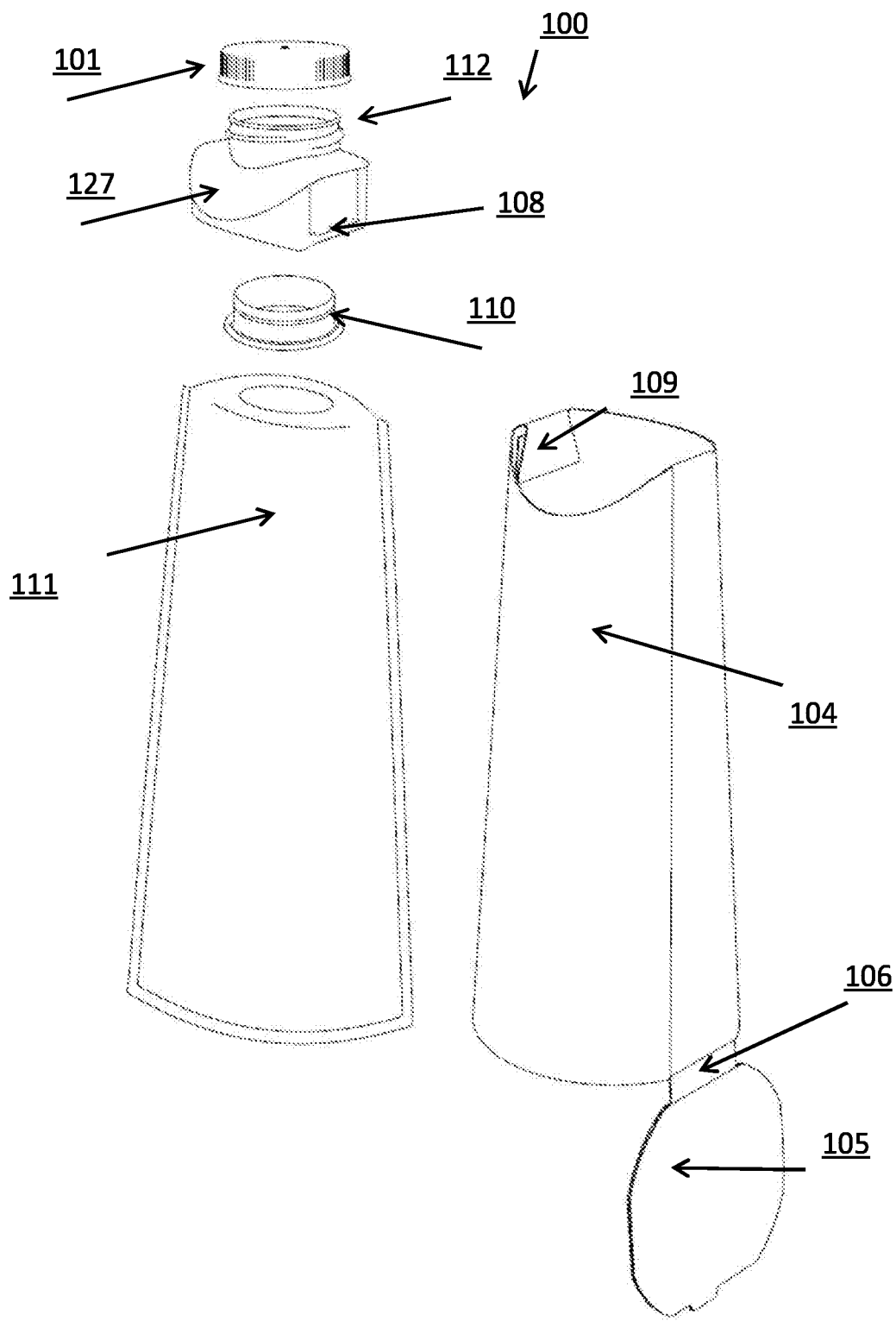
FIGS. 8A and 8B depict another exploded side view of various components of the inventive beverage container.

FIGS. 8A and 8B depict another side-view of components of beverage container 100. Locking tab 109 and protrusion 108 are depicted.

With reference to now to FIGS. 1-8, the assembly of beverage container 100 will be further discussed. Shell 103 optionally comprises cellulose fiber. Optionally, graphics can be printed on shell 103 to indicate the location where the beverage container is being sold, or to provide advertising. Shell 103 is cut into a two dimensional flat shape and run through a standard automatic folder-gluer to fold the shell and glue it on its side, as well as to glue the bottom flap 105. Mechanical sealing ring 110, closure shoulder 102, and cap 101 are all injection-molded, preferably using compostable polymers. Beverage bag 111 is blow-molded and then heat-sealed to the form a bag. The bottom of beverage bag 111 is sealed after the mechanical sealing ring 110 is inserted into beverage bag 111.

The assembly comprising beverage bag 111 and sealing ring 110 is inserted into cavity 113 of closure shoulder 102, where collectively those components form a liquid-tight seal and are permanently fixed because of a strong push-fit and engagement of locking rings 116 and 117. The bottom of beverage bag 111 is then heat sealed, leaving only one opening in beverage bag 111 (i.e., drinking spout 112 on closure shoulder 102, through opening 114). Cap 101 is then tightened onto drinking spout 112 resulting in a sealed container. The sealed container is then inserted into shell 103, securing the closure assembly to it without the use of adhesives.

Beverage container 100 is an improvement over the container disclosed in the Kiosk Application. In the Kiosk Application and in the invention described herein, the beverage container is stored in the kiosk with a cap pre-installed. In the Kiosk Application, the cap contains a hole through which the beverage is injected. By contrast, in the present application, cap 101 contains no holes. This reduces the complexity of the cap design and manufacturing process and also provides a more watertight enclosure. In the present invention, during the filling and dispensing process, cap 101 is removed from drinking spout 112, the container is filled, and cap 101 is reattached.

Thus, the method described in this application has various benefits. The container can be filled more quickly. There is less dripping or splashing of the liquid during the dispensing process. The cap is easier and less costly to manufacture. The cap design is sleeker. These are all important benefits that distinguish the current invention from the previous invention.

Figure 9:
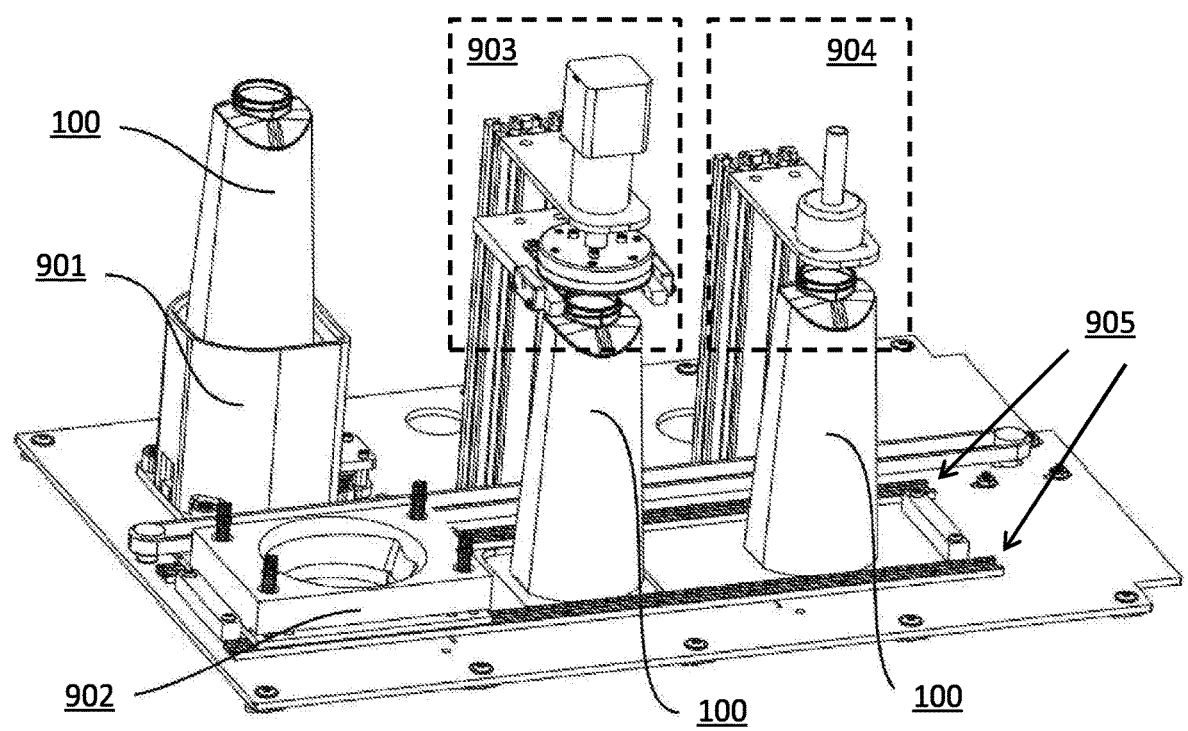
FIG. 9 depicts a capping system for receiving a beverage container, detaching the cap, filling the beverage container, and reattaching the cap.

With reference now to FIG. 9, additional detail is provided about the filling and dispensing process. A capping mechanism 900 is depicted. As shown in FIG. 2B, multiple units of beverage container 100 are stored in a stacked, nested formation, with each bottom flap 105 open. A robot grabs a single unit of beverage container 100 and pushes it into closing unit 901, which pushes bottom flap 105 upward into shell 103, such that notch 107 engages with the sidewall of shell 103 (optionally, by inserting into a slit in the slide wall of shell 103), and closes the bottom of beverage container 100.

The robot then places beverage container 100 into shuttle 902, which moves beverage container 100 along tracks 905 to capping sub-assembly 903 and dispensing sub-assembly 904. Capping sub-assembly 903 engages cap 101, unscrews cap 101 from drinking spout 112, and holds cap 101. Shuttle 902 then moves beverage container 100 along tracks 905 to dispensing sub-assembly 904, where beverage bag 111 is filled with filtered water as discussed in the Kiosk Application. Shuttle 902 then moves beverage container 100 back to capping sub-assembly 903, where capping sub-assembly screws cap 101 back onto drinking spout 112. Beverage container 100 can then be dropped down to a rotating door so a consumer can retrieve beverage container 100 for consumption. Optionally, shuttle 902 can be controlled by belt-driven and/or rod-driven linear actuators powered by electric motors and/or pneumatic actuators.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A beverage container, comprising:
   an outer shell comprising a locking tab;
   a beverage bag within the outer shell, the beverage bag comprising a top opening;
   a mechanical sealing ring comprising a first portion located within the beverage bag and a second portion protruding outside of the top opening of the beverage bag, the second portion comprising a first locking ring;
   a vertically-oriented closure shoulder comprising a second locking ring and a protrusion comprising a horizontally-extending surface, wherein the second locking ring is engaged with the first locking ring to clamp between them a portion of the beverage bag surrounding the top opening of the beverage bag and the locking tab is engaged approximately perpendicularly with the horizontally-extending surface of the protrusion to prevent the closure shoulder from being removed from the outer shell; and
   a cap secured to the closure shoulder.

2. The beverage container of claim 1, wherein the outer shell further comprises a bottom flap comprising a notch engaged with a side wall of the outer shell.

3. The beverage container of claim 1, wherein the beverage container is shaped to receive a second beverage container of the same design in a nested configuration.

4. The beverage container of claim 1, wherein the beverage container is compostable.

5. The beverage container of claim 4, wherein the outer shell comprises one or more of paper, paperboard, or laminated cellulose fiber.

6. The beverage container of claim 5, wherein the mechanical sealing ring, the closure shoulder, and the cap comprise compostable polymers.

7. A method of assembling a beverage container, comprising:
   placing a mechanical sealing ring in a bag through a first opening in the bottom of the bag;
   moving a portion of the mechanical sealing ring through a second opening in the top of the bag;
   engaging a first locking ring on the mechanical sealing ring with a second locking ring in a closure shoulder, the mechanical sealing ring and the closure shoulder clamping between them a portion of the bag around the second opening;
   sealing the first opening in the bottom of the bag;
   securing a cap to the closure shoulder; and
   placing an outer shell around the bag.

8. The method of claim 7, wherein the closure shoulder comprises a protrusion and the outer shell comprises a locking tab, the method further comprising:
   engaging the locking tab with the protrusion to keep a portion of the closure shoulder within the shell.

9. The method of claim 7 further comprising:
   closing a bottom flap on the outer shell.

10. The method of claim 9, wherein the beverage container is compostable.

11. The method of claim 10, wherein the outer shell comprises one or more of paper, paperboard, or laminated cellulose fiber.

12. The method of claim 11, wherein the mechanical sealing ring, the closure shoulder, and the cap comprise compostable polymers.

13. A method of stacking beverage containers, comprising:
   assembling a first beverage container according to the method of claim 7;
   assembling a second beverage container according to the method of claim 7; and
   placing the second beverage container under the first beverage container, such that the cap of the second beverage container is nested within the closure shoulder of the first beverage container.

14. The method of claim 13, wherein the first beverage container and the second beverage container are compostable.

15. The beverage container of claim 2, wherein the outer shell further comprises a hinge connecting the bottom flap to a portion of the side wall, wherein the bottom flap is movable along the hinge between a direction parallel to the side wall and a direction perpendicular to the side wall.

16. The beverage container of claim 2, wherein the notch inserts into a slit in the side wall.

17. The beverage container of claim 15, wherein the notch inserts into a slit in the side wall.

* * * * *